United States Patent [19]

Moore et al.

[11] Patent Number: 4,783,508
[45] Date of Patent: Nov. 8, 1988

[54] EMULSION PROCESS FOR PREPARATION OF OCCLUDED RUBBER STRUCTURE

[75] Inventors: Eugene R. Moore; Thomas D. Traugott, both of Midland, Mich.

[73] Assignee: The Dow Chemical Company, Midland, Mich.

[21] Appl. No.: 19,266

[22] Filed: Feb. 26, 1987

[51] Int. Cl.$^4$ .................. C08F 279/04; C08F 279/02; C08F 279/06
[52] U.S. Cl. .................................. 525/310; 525/315; 525/316
[58] Field of Search ................. 525/316, 310, 315

[56] References Cited

U.S. PATENT DOCUMENTS

| | | | |
|---|---|---|---|
| 3,213,159 | 10/1965 | Adomaitis | 525/316 |
| 3,855,355 | 12/1974 | Moore | 525/316 |
| 4,226,955 | 10/1980 | Bracke et al. | 525/316 |

FOREIGN PATENT DOCUMENTS

| | | | |
|---|---|---|---|
| 0202211 | 11/1984 | Japan | 525/316 |
| 2055387 | 3/1981 | United Kingdom | 525/315 |

*Primary Examiner*—Wilbert J. Briggs, Sr.

[57] ABSTRACT

An impact resistant thermoplastic polymer comprising highly occluded rubbery particles is prepared by contacting an emulsion of a rubbery polymer with at least one addition polymerizable, graftable monomer under conditions such that the rubber emulsion particles imbibe the monomer, but substantially no monomer polymerization occurs followed by free radically polymerizing the monomer and thereafter repeating steps (a) and (b) at least one more time.

6 Claims, No Drawings

EMULSION PROCESS FOR PREPARATION OF OCCLUDED RUBBER STRUCTURE

BACKGROUND OF THE INVENTION

The present invention relates to an emulsion polymerization process for the preparation of grafted and occluded rubbery particles. More particularly, the present invention relates to such an emulsion process allowing great flexibility in the preparation of rubbery particles having a relatively large volume of occluded matrix polymer.

The preparation of rubbery graft copolymers by emulsion techniques is well known in the art. Suitably, a preformed emulsion of a rubbery polymer such as a homopolymer or copolymer of a conjugated diene is contacted with at least one suitable addition polymerizable monomer and the resulting mixture subjected to polymerization conditions. Suitably a free radical initiator such as the well known peroxide initiators is included and the mixture is exposed to elevated temperatures until substantially complete polymerization of the monomers is achieved. The latex is recovered and dewatered by well known techniques to achieve a solid thermoplastic polymer. The resulting polymer normally contains a matrix of the polymerized monomer or monomers and dispersed therein rubbery particles having grafted thereto and occluded therein additional quantities of the matrix polymer. Such emulsion polymerized polymers are suitably employed as thermoplastic molding resins and depending on the monomer or monomers employed have found wide spread use.

The efficient utilization of rubber particles in imparting impact resistance to thermoplastic resins requires that the phase volume of such rubber particle should be maximized. Generally, by increasing the rubber phase volume greater impact properties of the resulting thermoplastic resin are obtained per unit weight of rubber employed. The modulus, however, generally decreases as the percent of rubber is increased. One suitable technique for increasing the phase volume of rubber particles involves preparation of such rubbery particles containing therein occlusions most generally of the hard matrix polymer sought to be impact modified by the rubbery polymer. This technique does not decrease the modulus significantly. Because of the polymerization conditions employed in the emulsion polymerization of impact modified thermoplastic resins, it is not possible to attain rubbery particles containing large amounts of occluded matrix polymer. Normally effective monomer migration and partitioning into the rubbery phase is not possible utilizing standard emulsion polymerization conditions and, therefore, such conditions are not suitably adapted to the preparation of rubbery particles having improved rubber phase volume.

It would be desirable if there were provided an emulsion polymerization process for preparing grafted and occluded rubbery polymers, wherein the rubbery particles contain an improved quantity and size of occluded matrix polymer thereby resulting in an improved rubber phase volume, without substantial loss in modulus.

In addition, it would be desirable if there were provided an improved polymerization process for preparing impact modified thermoplastic resins containing the above improved rubbery particles.

In addition, it would be desirable if there were a product having both a high level of occlusions and the uniformly near spherical geometry produced by emulsion polymerization. Particularly desirable is the relatively transparent product which is obtained when the occlusions are relatively small (below about 700 Angstroms) and/or constitute a larger portion of the rubber particle.

SUMMARY OF THE INVENTION

According to the present invention, there is now provided a process for preparing occluded and grafted rubbery polymers comprising:

(a) contacting an emulsion comprising a rubbery polymer with at least one addition polymerizable, graft producing monomer under conditions such that the rubber emulsion particles imbibe the monomer but substantially no monomer polymerization occurs;

(b) initiating free radical polymerization of the monomer; and

Repeating steps (a) and (b) at least once more to thereby result in preparation of occluded and grafted rubbery particles.

DETAILED DESCRIPTION OF THE INVENTION

The rubbery polymer employed in the emulsion polymerization process of the present invention may be any suitable rubbery polymer. Preferred are those polymers and copolymers having a Tg of less than about 0° C. Examples include the well known homopolymers and copolymers of conjugated dienes, especially butadiene. Copolymerizable comonomers include vinyl aromatic monomers, especially styrene, acrylonitrile, methylmethacrylate, and mixtures thereof. A preferred rubbery polymer comprises a polymer of 1,4-butadiene containing at least 90 weight percent 1,4-butadiene.

Suitable addition polymerizable graft producing monomers for preparation of the highly occluded rubber polymers of the present invention include monovinylidene aromatic monomers, ethylenically unsaturated nitriles and ethylenically unsaturated carboxylic acids or esters thereof, the foregoing having up to about 12 carbons. Mixtures of such monomers may also be employed. Preferred polymerizable monomers include styrene, mixtures of styrene and acrylonitrile, of styrene and methyl methacrylate, or of styrene, acrylonitrile and methylmethacrylate.

In the preferred operation of the process, the rubbery emulsion particles are allowed to imbibe the monomer or mixture of monomers by contacting the same at a temperature less than about 45° C., preferably less than about 25° C. At such reduced temperatures, substantially no polymerization of the monomers occurs during the contacting period. After contacting for a suitable time period to allow swelling of the rubber particle, usually for a period of 5 minutes to one-half hour, and generally under the influence of agitation, polymerization is initiated. A free radical initiator or radiation such as gamma radiation may be employed if desired. The initiator may be added subsequent to the initial contact period or be present throughout the process. In the latter event onset of polymerization is controlled merely by raising the temperature of the monomer/rubber mixture. Suitably a polymerization temperature of 50° C. or more is employed. Suitable free radical initiators include the well known peroxide or persulfate initiators. Additional additives such as chain transfer agents, antioxidants and other suitable emulsion polymerization additives may also be employed. Generally, a polymerization period of from about 15 minutes to about 2 hours is sufficient. It is not necessary to completely polymerize the available addition polymerizable monomer.

After termination of monomer polymerization, by exhaustion of initiator or reduction of the temperature of the reactor, the reactor contents are cooled to approximately 45° C. or less, and an additional quantity of one or more monomers, which may be the same or different than the monomers previously employed, is charged to the reactor vessel. The rubbery polymer is again allowed to contact the addition polymerizable, graft producing monomer or monomers and imbibe the same therein, swelling in the process. Once again, free radical initiated polymerization is begun resulting in further growth of the occluded polymer phase within the rubbery paticles and the formation of additional graft and free matrix polymer. Any desired amount of occluded polymeric material may be formed within the rubbery particles according to the present technique. Preferably, the steps (a) and (b) are repeated at least about three times and most preferably at least about five times to achieve optimum rubber particle phase volume.

As is true in any emulsion polymerization process, the degree of grafting achieved during the process may be controlled by altering the amount of chain transfer, the amount of initiator, or the polymerization temperature. Thus, any ratio of grafted to occluded polymer in the rubber particles may be obtained according to the present process. Also the size and number of occlusions can be increased by more rapidly initiating polymerization.

Where large rubber particles are obtained by agglomeration techniques (such as controlled destabilization of latex during agitation) occlusions may be obtained or improved in uniformity by co-agglomeration of the rubber base latex with a small (300 to 700 Angstrom volume average) rigid phase latex. The resulting rubber agglomerates have uniform occlusions of the rigid phase latex particles. These occlusions may be increased in size and by repeating the previously described process of alternately imbibing and polymerizing.

Preferably, the occluded particles resulting from the invention contain at least 20 percent and most preferably, 50 percent occlusions based on total rubber phase volume.

The following examples are provided as further illustrative and are not to be construed as limiting. Where provided parts, percentages, and ratios are expressed by weight.

COMPARATIVE EXAMPLE

A glass-lined emulsion polymerization reactor (about 200 gal) equipped with an agitator, monomer and aqueous stream charging means and an inert atmosphere is used. To the clean reactor is charged: 216 lbs of deionized water, 1.78 lbs of sodium persulfate, 1.977 lbs of sodium bicarbonate, 0.593 lbs of sodium hydroxide, 0.253 lbs of a 10 percent active solution of a chelating agent (Versene ® 100 available from The Dow Chemical Company), and 21.75 lbs of a soap masterbatch (2.93 percent sodium oleate, 6.85 percent Dresinate 214 (Potassium salt of abietic acid sold by Hercules), and 0.08 percent sodium hydroxide. The reactor is purged of oxygen, and a rubbery monomer charge consisting of: 27.68 lbs (7 weight percent) styrene, 11.86 lbs (3 weight percent) acrylonitrile, 355.93 lbs (90 weight percent) butadiene, and 0.989 lbs of tertiary dodecyl mercaptan is added. The agitator is started and the temperature raised to 65° C., where the reaction is allowed to proceed for 10 hours at which time an additional 31.64 lbs of the above soap masterbatch is added. After an additional hour, the aggitation speed is lowered from 115 to 60 RPM. Reaction is continued until the butadiene pressure has decreased to 85 psig. At this point, an aqueous stream (455.48 lbs of the soap masterbatch, 584 lbs of deionized water, 0.475 lbs of sodium persulfate) is started to the reactor at a rate of 63 lbs/hr. After four hours of aqueous addition, the temperature is increased to 80° C. This temperature increase occurred uniformly over 6 hours. Reaction is continued until the pressure drops to 50 psig. At this time, an additional aqueous charge is added (45.48 lbs of the soap masterbatch, 583.7 lbs of deionized water, 0.475 lbs of sodium persulfate) and a monomer charge (14.23 lbs styrene, 5.53 lbs of acrylonitrile and 0.178 lbs of normal octyl mercaptan) is added uniformly over a period of one hour. Two additional hours of reaction time are allowed before the butadiene is purged and the reactor cooled. The particle size of the resulting rubber latex is analyzed using Hydrodynamic Chromatography. The latex is seen to have a broad distribution of particle sizes, but can be split into three zones: small particles with 850 Angstroms diam (3.6 percent), medium particles with 2800 Angstroms diam (88.2 percent), and large 8388 Angstroms diam particles (7.2 percent). The mean particle diameter of all particles is seen to be 3325 Angstroms. When these particles are prepared for electron microscopy (by coagulation with about 80 weight percent of a small particle SAN latex) and observed, no occlusions are seen in any of the particles. Solids content of this latex is about 30 percent by weight.

EXAMPLE 1

A portion of the latex prepared by the above comparative example (1205 lbs) is charged to a clean reactor, at 25° C. A monomer stream comprising 17.9 lbs styrene, 6.97 lbs of acrylonitrile and 0.23 lbs of n-octyl mercaptan is added uniformly with agitation, then an aqueous charge of 1.216 lbs water, 0.033 lbs sodium hydrosulfite and 0.037 lbs of sodium hydroxide is added. At this point, 40.4 lbs of an aqueous initiator solution is added (39.1 lbs D.I. water, 0.166 lbs sodium persulfate, 0.125 lbs sodium bicarbonate, 0.0458 lbs of sodium hydroxide, 0.9689 lbs of Calsoft ® (soap at 43 weight percent active) solution. The reactor and its contents are maintained at approximately 30° C. for 20 minutes to assure partitioning of the monomer into the rubber particles. The reactor is then heated to approximately 70° C. and maintained at that temperature for approximately 4 hours. The reactor is cooled and the above procedure repeated for a total of 10 monomer additions and polymerizations. The resulting product is then steam stripped to remove unreacted monomer then is mixed with an SAN latex as in Example 1, to prepare for microscopy, then recovered by freeze coagulation and drying. All particles except the finest contain multiple occlusions of the rigid polymer. The rubber phase of the product volume is approximately twice that of the comparative example.

EXAMPLE 2

The procedures of Example 1 are repeated, excepting that the reactor is heated to polymerization temperature (90° C. in this case) before the initiator is added during each polymerization. The same beneficial increase in rubber phase volume is seen, but the particle size of the occlusions in the rubber is smaller. More of the smaller rubber particles contain occlusions compared to the product of Example 1.

TESTING

The polymers of Examples 1 and 2 as well as the comparative example are grafted in a conventional manner with an equal weight of grafting monomers having the same approximate composition as the occlusions. The resulting grafted rubber product is compounded with a styrene/acrylonitrile copolymer with 29 weight percent acrylonitrile to produce an ABS comprising 20 weight percent total polymerized butadiene content. The following results are obtained:

(a) The product of Example 1 has approximately the same stiffness (modulus) as the product of the comparative example, but exhibits a much higher toughness.

(b) The product of Example 2 is found to have the high toughness of Example 1, but in addition also has substantially improved clarity. This is thought to be due to the substantial reduction in rubber membrane size separating occlusions inside the rubber particles.

Approximately twice as much rubber graft copolymer must be added of the comparative example to achieve comparable toughness to that obtained by use of the copolymer of Example 1. As a result, the modulus of the resin containing larger amounts of the comparative rubber decreases. Upon molding, the object containing the resin of Example 1 achieves reduced gloss.

What is claimed is:

1. A process for preparing highly occluded rubbery polymers comprising:
   (a) contacting an emulsion comprising a rubbery polymer with at least one addition polymerizable, graft producing monomer under conditions such that the rubber emulsion particles imbibe the monomer but substantially no monomer polymerization occurs;
   (b) initiating free radical polymerization of the monomer; and
   repeating steps (a) and (b) at least once more employing the product of step (b) as the rubbery polymer in step (a) to thereby result in preparation of occluded and grafted rubbery particles.

2. A process according to claim 1, wherein the rubbery polymer comprises a homopolymer or copolymer of butadiene.

3. A process according to claim 2, wherein the rubbery polymer comprises a homopolymer of 1,3-butadiene.

4. A process according to claim 1, wherein the polymerizable monomer comprises a monovinylidene aromatic monomer, an ethylenically unsaturated nitrile, an ethylenically unsaturated carboxylic acid or ester thereof, or a mixture thereof.

5. A process according to claim 4, wherein the polymerizable monomer comprises styrene, or a mixture of styrene and acrylonitrile.

6. A process according to claim 1, wherein steps (a) and (b) are repeated at least about three times.

* * * * *